US007817581B2

(12) United States Patent
Blackwell et al.

(10) Patent No.: US 7,817,581 B2
(45) Date of Patent: Oct. 19, 2010

(54) METHODS AND SYSTEMS FOR NETWORK CHANNEL CAPACITY PLANNING, MEASURING AND ANALYZING OF WLAN NETWORKS

(75) Inventors: Warren Blackwell, Santa Clara, CA (US); Kevin Wang, Sunnyvale, CA (US); Chia-Chee Kuan, Los Altos, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 230 days.

(21) Appl. No.: 12/077,848

(22) Filed: Mar. 20, 2008

(65) Prior Publication Data

US 2009/0238095 A1 Sep. 24, 2009

(51) Int. Cl.
*H04L 12/28* (2006.01)
(52) U.S. Cl. ...................... 370/254; 370/338
(58) Field of Classification Search ................. 370/254, 370/328–339
See application file for complete search history.

(56) References Cited

U.S. PATENT DOCUMENTS

| 7,035,642 | B2* | 4/2006 | Rappaport et al. .......... 455/446 |
| 7,184,777 | B2* | 2/2007 | Diener et al. ............. 455/456.1 |
| 2004/0259555 | A1 | 12/2004 | Rappaport et al. |
| 2005/0059406 | A1 | 3/2005 | Thomson et al. |
| 2005/0165919 | A1 | 7/2005 | Qian et al. |

OTHER PUBLICATIONS

Ebert, J.-P., et al., "An IEEE 802.11 WLAN Simualtion Model", downloaded on Feb. 26, 2008 from http://www.tkn.tu-berlin.de/research/research_texte/WLANmodel.html, (Nov. 13, 2000), 3 pages.
Pant, Pavan, et al., "Simulation of an 802.11 Wireless Network", downloaded on Feb. 26, 2008 from http://nislab.bu.edu/sc546/sc546Fall2002/wireless/index.htm. (2002), 2 pages.
Song, Charles, "IEEE 802.11 MAC Simulator with DCF and Power-Saving Mode", downloaded on Feb. 26, 2008 from http://www.cs.umd.edu/Honors/reports/falcon-research.pdf, University of Maryland, Department of Computer Science, College Mark, Maryland, (2003), 15 pages.
University of Luxembourg, SECAN-LAB, "802.11 (WiFi) Simulator for Ad-Hoc networks", downloaded on Feb. 26, 2008 from http://wiki.uni.lu/secan-lab/802.11+Simulator.html, (2002-2006), 5 pages.
International Search Report for PCT Patent Application No. PCT/US2009/036688, Apr. 27, 2009, 2 pgs.
Written Opinion of the International Searching Authority for PCT Patent Application No. PCT/US2009/036688, Apr. 27, 2009, 7 pgs.

* cited by examiner

*Primary Examiner*—Frank Duong
(74) *Attorney, Agent, or Firm*—Blakely, Sokoloff, Taylor and Zafman LLP

(57) ABSTRACT

An apparatus and method for network channel capacity planning, measuring, and analyzing of WLAN networks are presented. In one embodiment, the method includes importing network and node configuration of an existing physical wireless local area network (WLAN) deployment from WLAN surveying system that captures and analyzes WLAN traffic in order to define a configuration of the existing physical WLAN, simulating a virtual WLAN using the imported network and node configuration as parameters of the simulated WLAN and applying various other configurations not present in the imported network and node configuration as parameters of the simulated WLAN, and analyzing the simulated WLAN to produce throughput statistics of network and nodes of the simulated WLAN.

20 Claims, 8 Drawing Sheets

METHODS AND SYSTEMS FOR NETWORK CHANNEL CAPACITY PLANNING, MEASURING AND ANALYZING OF WLAN NETWORKS

FIELD OF THE INVENTION

The embodiments of the invention relate generally to wireless local area networks (WLANs) and, more specifically, relate to network channel capacity planning, measuring, and analyzing of WLAN networks.

BACKGROUND

Computers have traditionally communicated with each other through wired local area networks (LANs). However, with the increased demand for mobile computers such as laptops, personal digital assistants, and the like, wireless local area networks (WLANs) have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Although WLANs provide users with increased mobility over wired LANs, the quality of communications over a WLAN can vary for reasons that are not present in wired LANs. For example, everything in the environment can behave as a reflector or attenuator of a transmitted signal. As such, small changes in the position of a computer in a WLAN can affect the quality and strength of a signal sent by the computer and can affect the network throughput of signals sent over the WLAN.

The 802.11 wireless standard has been amended various times to improve upon the standard and provide better performance results. For instance, the 802.11a, 802.11b, 802.11g, and 802.11n standards have been either implemented or introduced for implementation since the original 802.11 standard was implemented in 1997. As a specific example, the 802.11n standard has recently been introduced to improve network throughput over previous standards.

Anytime a new standard is introduced, the impact of various conditions on the networking standard is sought to be understood. Typically, the actual hardware implementing the networking standard can be utilized to understand the impact of various condition changes on the standard's performance statistics. However, for newly introduced standards, these physical hardware components do not yet exist. As such, a simulation tool to simulate the network standard and the impact of various conditions on the network standard would be a valuable tool.

Several 802.11 simulation tools (both research and commercial) have been developed. However, none of these existing 802.11 simulation tools allow for a physically deployed IEEE 802.11 WLAN network configuration to be imported into a simulation engine and use this configuration as an input to the creation of "virtual" nodes in the simulation engine.

In addition, the existing 802.11 simulation tools do not allow for the intelligent use of only those parameters of the IEEE 802.11 specification which affect throughput. Instead, the prior 802.11 simulation tools require the full scope of the IEEE 802.11 specification to be implemented in order to derive insight into various throughput metrics.

Finally, the existing 802.11 simulation tools do not allow for an end-user to observe and understand the real-time operation of an IEEE 802.11 network, which ordinarily operates at speeds too fast for a human to discern individual events and states. As such, a simulation tool that overcomes the above deficits of an 802.11 simulation tool would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
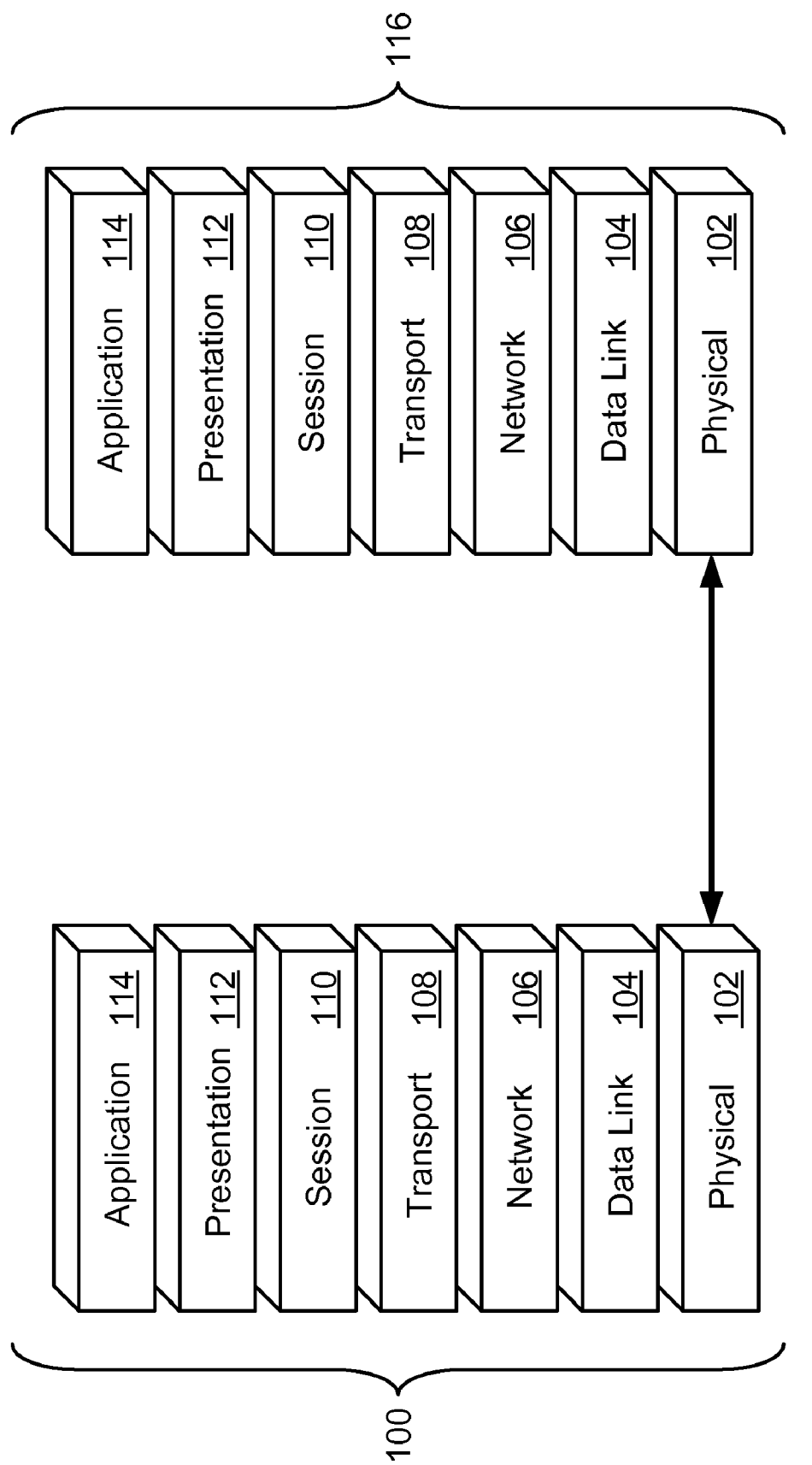
FIG. 1 illustrates an exemplary Open Systems Interconnection (OSI) seven layer model.

A method and apparatus for network channel capacity planning, measuring, and analyzing of WLAN networks are described. In one embodiment, the method includes importing network and node configuration of an existing physical wireless local area network (WLAN) deployment from WLAN surveying system that captures and analyzes WLAN traffic in order to define a configuration of the existing physical WLAN. In addition, the method includes simulating a virtual WLAN using the imported network and node configuration as parameters of the simulated WLAN and applying various other configurations not present in the imported network and node configuration as parameters of the simulated WLAN. Lastly, the method includes analyzing the simulated WLAN to produce throughput statistics of network and nodes of the simulated WLAN.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the embodiments of the invention may be practiced without these specific details. In other instances, well-known structures and devices are shown in block diagram form, rather than in detail, in order to avoid obscuring the invention.

Embodiments of the invention introduce methods and systems for network channel capacity planning, measuring and analyzing IEEE 802.11 a/b/g/n WLAN network and node throughput statistics, under various conditions and configurations. Prior to describing embodiments of the invention, some terms that may be used throughout the description are defined.

Definitions, Terms, Elements

WLAN: Wireless LAN (Local Area Network).

Throughput: The speed at which data bits are transferred, as measured at the Logical Link Control (LLC) sublayer of Layer 2 (Data Link Layer).

Network: A series of two (2) or more 802.11 nodes operating together.

Node: One (1) IEEE 802.11 station (STA) or Access Point (AP).

DCF: Distributed Coordination Function; the method by which (most) IEEE 802.11 WLAN networks allow nodes to share the wireless medium.

TXOP: Transmit opportunity.

IFS: Interframe Spacing; the required "idle" time on the wireless medium in between frames.

Preamble: The portion of the packet (at the start) that allows a receiver to adjust the receive parameters.

Payload: The actual bits of data which are being transferred.

Channel: The logical "slice" of RF spectrum on which a group of nodes communicate.

Media Type: One of 802.11a, 802.11b, 802.11g or 802.11n, for instance, although not limited to these standards; defines physical (PHY) and medium access control (MAC) layer parameters for a node and network.

Self-calibrating Timer: A timer that takes into account the overhead in measuring a high-resolution performance counter when calculating the "current time".

FIG. 1 illustrates an exemplary OSI seven layer model, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers 100 and 116 can communicate directly with each other only at the physical layer 102.

However, different computers 100 and 1126 can effectively communicate at the same layer using common protocols. For example, in one exemplary embodiment, computer 100 can communicate with computer 116 at application layer 114 by propagating a frame from application layer 114 of computer 100 through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks (WLANs) operates at the data link layer 104, which corresponds to layer 2 of the OSI seven layer model, as described above. Because 802.11 operates at layer 2 of the OSI seven layer model, layers 3 and above can operate according to the same protocols used with 802.3 wired LANs. Furthermore, layers 3 and above can operate identically in the IEEE 802 wired LAN and the IEEE 802.11 WLAN. Furthermore, users can be presented with the same interface, regardless of whether a wired LAN or WLAN is used.

Figure 2:
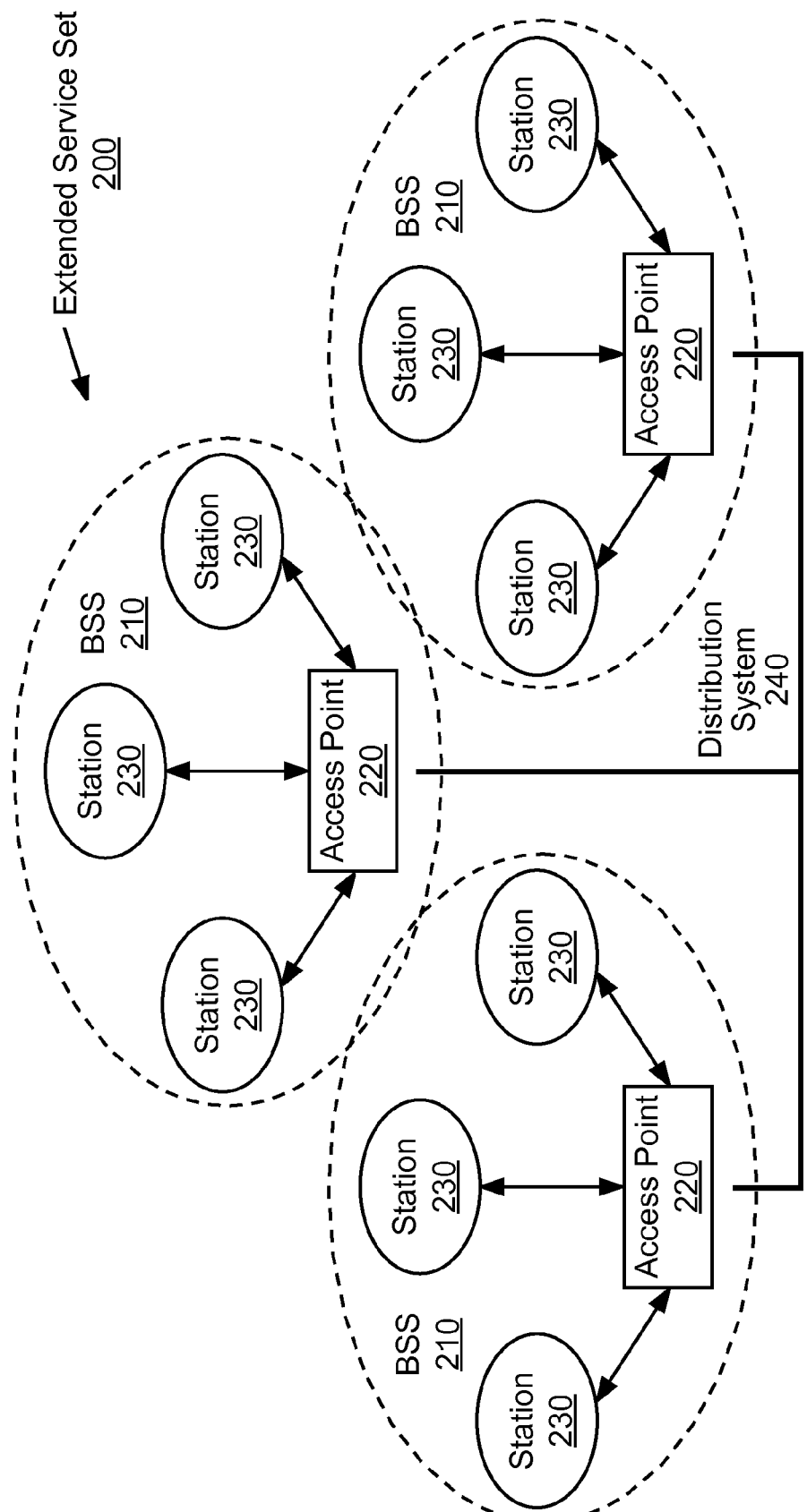
FIG. 2 illustrates an exemplary extended service set in a wireless local area network (WLAN)

With regard to FIG. 2, an example of an extended service set 200, which forms a WLAN according to the IEEE 802.11 standard, is depicted having three basic service sets (BSS) 210. In one embodiment, each BSS 210 may communicate by utilizing the OSI framework as described with respect to FIG. 1. Each BSS 210 can include an access point (AP) 220 and one or more stations 230. A station 230 is a component that can be used to connect to the WLAN, which can be mobile, portable, stationary, and the like, and can be referred to as the network adapter or network interface card. For instance, a station 230 can be a laptop computer, a personal digital assistant, and the like. In addition, the station 230 can support station services such as authentication, deauthentication, privacy, delivery of data, and the like.

Each station 230 can communicate directly with an AP 220 through an air link, such as by sending a radio or infrared signal between WLAN transmitters and receivers. Each AP 220 can support station services, as described above, and can additionally support distribution services, such as association, disassociation, distribution, integration, and the like. Accordingly, an AP 220 can communicate with one or more stations 230 within its BSS 210, and with other APs 220 through a medium, typically called a distribution system 240, which forms the backbone of the WLAN. This distribution system 240 can include both wireless and wired connections.

Figure 3:
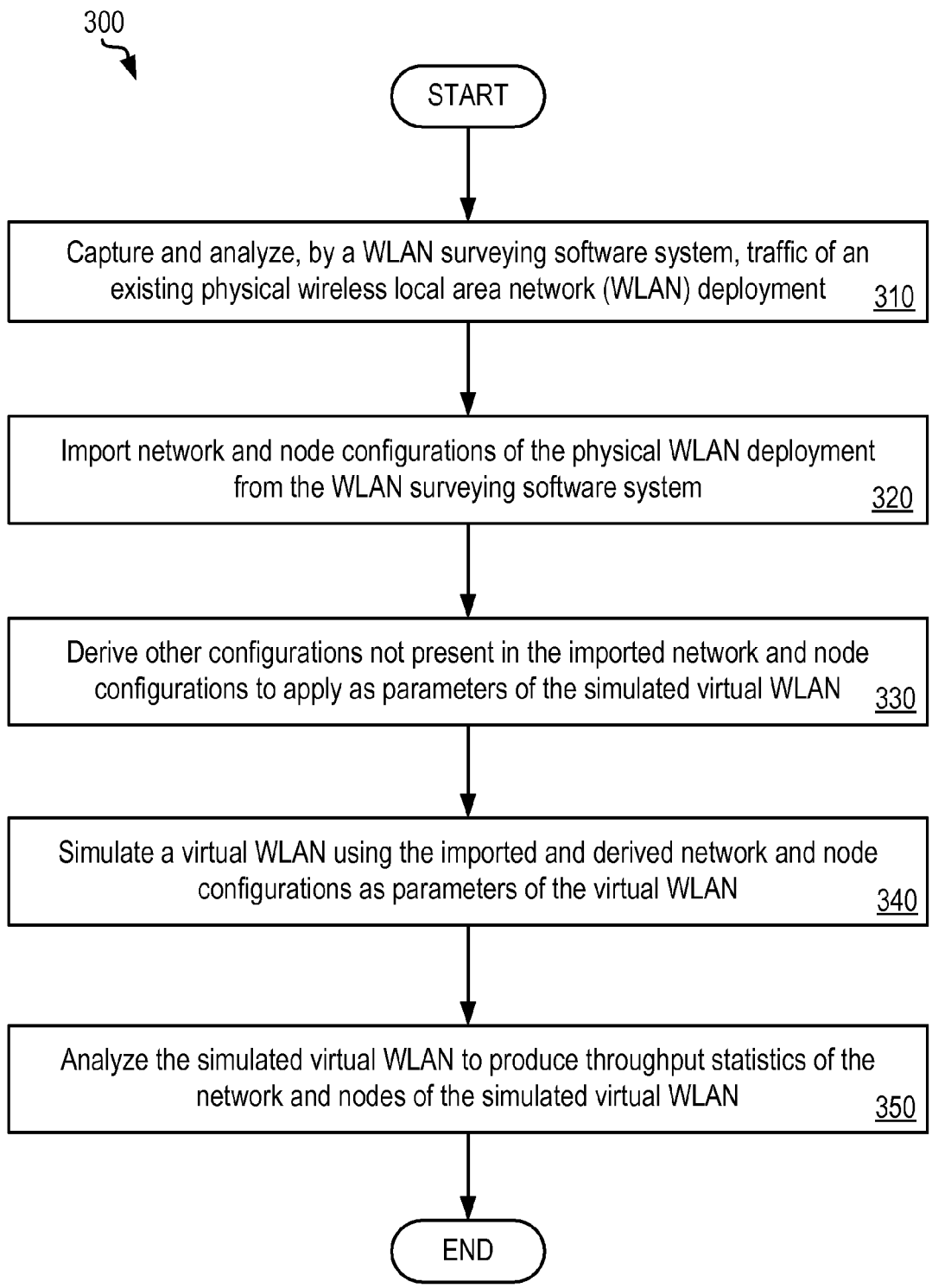
FIG. 3 is a flow diagram depicting one embodiment of a method for network channel capacity planning, measuring, and analyzing of WLAN networks via simulation.

FIG. 3 is a flow diagram depicting one embodiment of a process 300 for network channel capacity planning, measuring, and analyzing of WLAN networks via simulation. In one embodiment, the WLAN networks may be implemented similar to the extended service set 200, as described with respect to FIG. 2. In one embodiment, process 300 may be performed by a proprietary software system that is surveying one or more off-the-shelf IEEE 802.11 conformant WLAN radio devices to capture and analyze WLAN traffic of the radio devices. Embodiments of the invention may operate in conjunction with, but are not limited to, 802.11 a/b/g/n networks. The proprietary software utilizes the captured and analyzed WLAN traffic in order to define an existing WLAN network configuration for a simulation tool.

Process 300 begins at process block 310 where the WLAN surveying software system captures and analyzes traffic of an existing physical WLAN deployment. Then, at process block 320, a simulation tool imports network and node configurations of the existing physical WLAN deployment from the WLAN surveying software system. In some embodiments, this simulation tool is part of the WLAN surveying software system. In yet other embodiments, the simulation tool may be a separate component from the WLAN surveying software system. In one embodiment, an end-user of the simulation tool may manually configure the parameters initially imported into the simulation tool.

Then, at process block 330, the simulation tool derives other configurations not present in the imported network and node configurations to apply as parameters of the virtual WLAN. At process block 340, the simulation tool simulates a virtual WLAN using the imported and derived network and node configurations as parameters of the virtual WLAN.

Finally, at process block 350, the simulation tool analyzes the simulated virtual WLAN to produce throughput statistics of the network and nodes of the simulated virtual WLAN. In some embodiments, these throughput statistics may include, but are not limited to, overall network throughput, average node throughput, individual node throughput, average node throughput based on media type, air time utilization by a node, packet count, and byte count. In one embodiment, these results are presented to an end-user of the simulation tool via a results screen.

Figure 4:
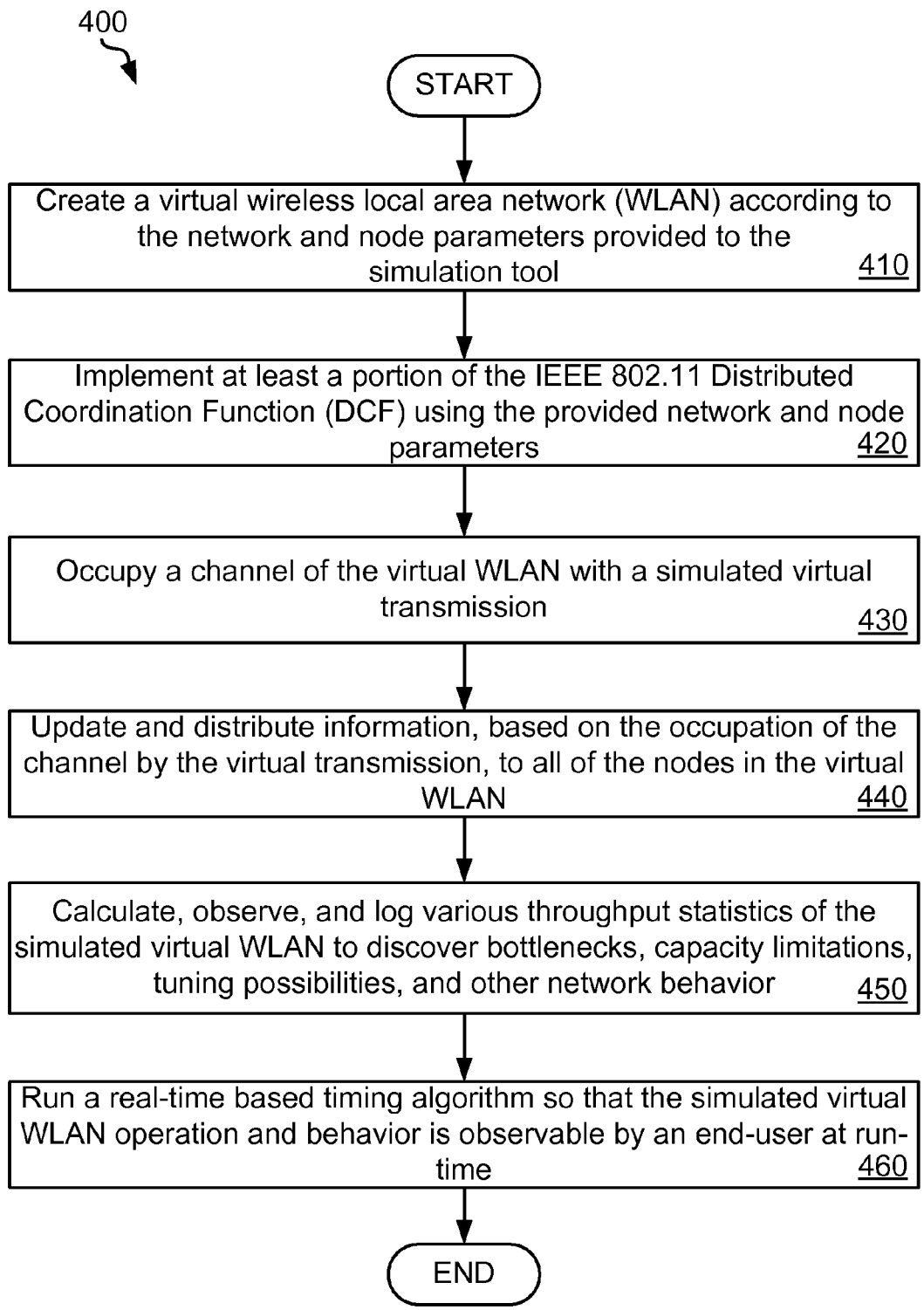
FIG. 4 is a flow diagram depicting one embodiment of a method for simulating a virtual WLAN using imported network and node configurations from an existing WLAN deployment.

FIG. 4 is a flowchart that illustrates one embodiment of a process 400 to simulate a virtual WLAN using imported network and node configurations from an existing WLAN deployment. Process 400 is performed by a simulation tool, such as the simulation tool described above with respect to FIG. 3. In one embodiment, process 400 provides further details of process block 330, as described with respect to FIG. 3, where a virtual WLAN is simulated as part of process 300.

Process 400 begins at process block 410 where the simulation tool creates a virtual WLAN according to network and node parameters provided to the simulation tool. As described above, these network and node parameters may be garnered from an analysis performed on an existing WLAN deployment by a WLAN surveying software system. In addition, the simulation tool may create additional configuration parameters that are not directly present in the captured WLAN traffic. Furthermore, an end-user of the simulation tool may define, modify, and configure network and node parameters utilized by the simulation tool to create the virtual WLAN.

In some embodiments, the network and node parameters utilized for the virtual WLAN include, but are not necessarily limited to: Data, ACK, RTS, and CTS Frame Lengths, IFS (Interframe Spacing, such as SIFS, DIFS and RIFS), Slot Time, CWMin, CWMax, Signal Extension Bits, Radio Preamble and PLCP Lengths, Maximum payload size, IEEE 802.11 amendment, Symbol Rate, Bits per Symbol, Tail Bits, 802.11n Operating Mode, Greenfield, 20/40 MHz channel width, Short Guard Interval, MCS, Number of Spatial Streams, Frame Aggregation Parameters, Block ACK Policy, PHY Data Rate, Modulation and Coding Type, Non-Greenfield STAs present, Non-ERP STAs present, Protection Mechanisms, AP and STA node designation, AP and STA association, RF Channel, Physical Location, Signal Strength, Transmit Power and RF Path Loss.

Next, at process block 420, the simulation tool implements at least a portion of the IEEE 802.11 Distributed Coordination Function (DCF), using network and node parameters defined in the PHY (physical) and MAC (medium access control) layers of the IEEE 802.11 specification. As defined previously, the DCF is the method by which most IEEE 802.11 WLANs allow nodes to share the wireless medium. Then, at process block 430, the simulation tool occupies a channel of the virtual WLAN with a simulated virtual transmission. In one embodiment, all of the network nodes of the virtual WLAN detect and are aware of this transmission.

At process block 440, based on the occupation of the channel by the virtual transmission, information is updated and distributed at each of the nodes of the virtual WLAN. For example, virtual carrier sense (NAV) and clear channel assessment (CCA) information is available and distributed to all of the nodes based on the simulated transmission. In addition, node, media type, and network statistics are updated in terms of packet (frame) and byte counts. These statistics provide the necessary data to calculate various throughput metrics, when coupled with time information, as seen in the remainder of process 400.

At process block 450, the simulation tool calculates, observes, and logs various network and node throughput statistics based upon the above implementation and simulation run-through. In one embodiment, the simulation tool may calculate packet (frame) duration and receive signal strength based upon the defined parameters and utilize these calculations as internal inputs for the simulation. Exemplary outputs of the simulation tool may include network throughput, average node throughput, and node throughput. The following are exemplary mathematical derivations that the simulation tool may utilize for its calculations, observations, and loggings in process block 450:

Packet Duration (μsec):

Interframe Space (μsec)+Preamble Length (μsec)+ ((Payload Size [bytes]/Bytes per Symbol)/Symbol Rate [Hz])/1e−6)

Receive Signal Strength (dBm):

Tx Power (dBm)−(32.4+20*$\log_{10}$(RF Frequency [Hz])+20*$\log_{10}$(Tx Distance [meters]/1e3)

Network Throughput (Mbps):

N (bytes, all nodes)/Time (seconds)*8 (bits per byte)

Average Node Throughput (Mbps):

(N (bytes)/Time (seconds)*8 (bits per byte))/M (nodes)

Node throughput (Mbps):

N (bytes)/Time (seconds)*8 (bits per byte)

Finally, at process block 460, the simulation tool runs a real-time based timing algorithm (e.g., involving a multi-threaded software system) such that the simulated network operation and behavior (such as the distribution of physical vs. virtual carrier sense back-off, or the nature of TXOP distribution in a DCF controlled network) is observable at runtime at any given instant, with a time-scaling factor. In some embodiments, such a real-time based timing algorithm may involve monitoring a self-calibrating timer, which is based on a high-resolution (hardware) performance counter of a computer system of the simulation tool.

Embodiments of the process 400 involve running the process 400 with varied numbers and configurations of nodes and network parameters, and then observing the varied resulting node and network throughput. This enables the discovery of bottlenecks, capacity limitations, tuning possibilities, and other network behavior.

Figure 5:
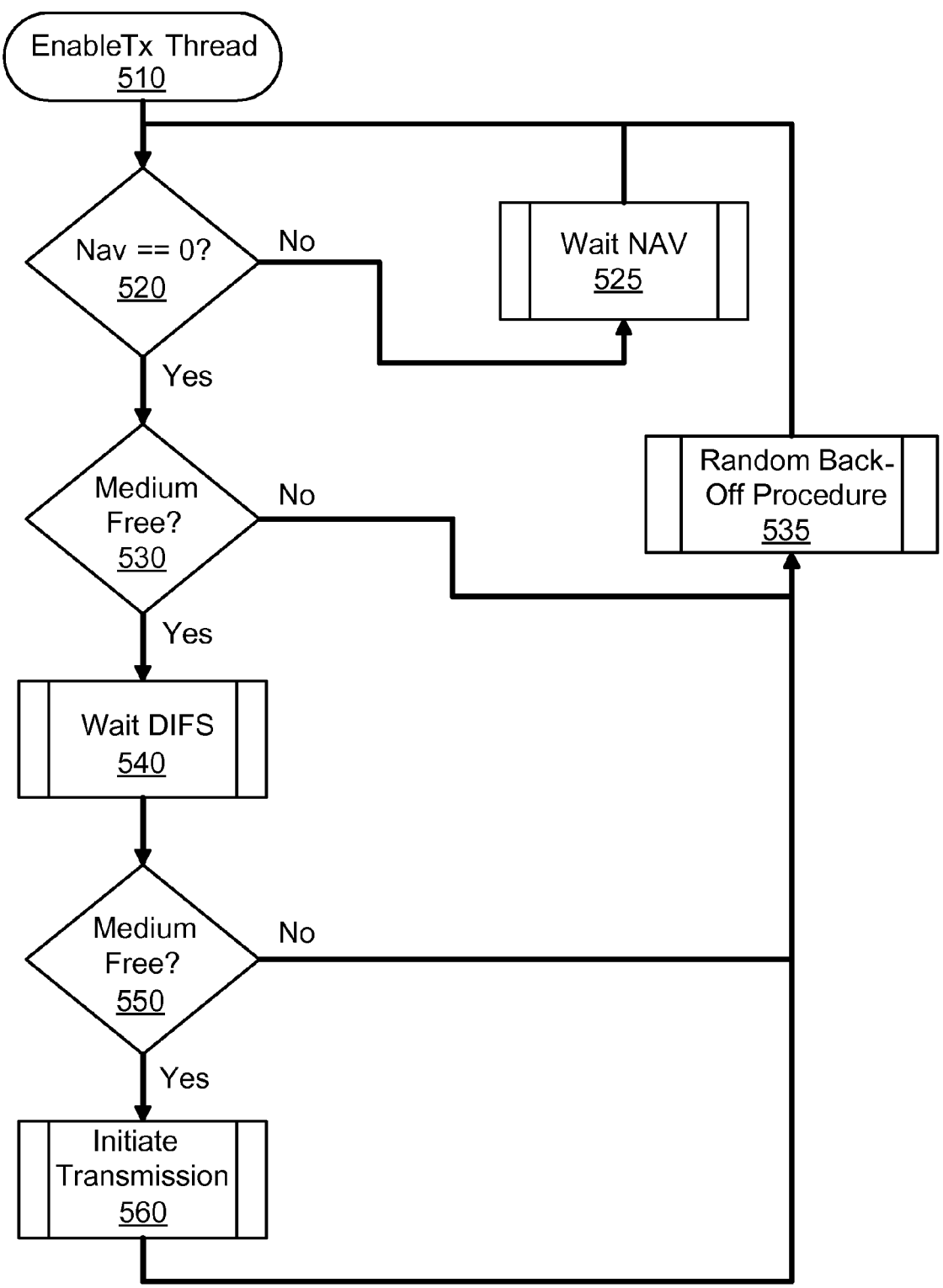
FIG. 5 is a flow diagram depicting one embodiment of a transmit opportunity process for a node.

FIG. 5 is a flow diagram providing an example process 500 that each node in a simulated virtual WLAN may progress through in order to transmit a packet. In one embodiment, each node of the virtual WLAN of the simulation tool would have its own computation thread devoted to performing process 500. As a result, each of the nodes of the virtual WLAN of simulation tool utilizes process 500 to transmit as quickly as possible. Process 500 is part of the DCF provided in the 802.11 specification. As such, in one embodiment, process 500 is part of process blocks 420 and 430 described with respect to FIG. 4.

Process 500 starts at process block 510 where the transmit thread for a particular node is enabled. Then, at decision block 520, the thread checks the network allocation value (NAV). The NAV represents whether a particular node has been informed previously by another station that the station is occupying the medium already. At decision block 520, if the NAV is equal to 0, then as far as the node knows, no one else is intending to transmit and the process 500 proceeds to decision block 530. If the NAV is not equal to 0, then the node must wait for that countdown to expire before trying to transmit again at process block 525.

At decision block 530, the node inspects the channel to see if the medium is free. If so, the 802.11 specification dictates that the node wait at least one DIFS (Distributed Coordination Interframe Space) at process block 540. After the DIFS, the thread determines again whether the medium is free at decision block 550. If the medium is still free after that, then the process 500 proceeds to process block 560 where the node then initiates a transmission according to the simulation.

If medium is not free before or after the DIFS period at decision blocks 530 or 550, then the 802.11 specification dictates that the node perform a random back-off procedure at process block 535. In one embodiment, the random back-off procedure includes the node determining a random integer value and multiplying that value by a slot time. This ensures that each node will not pick the same value for back off and wait the same period of time, thereby never freeing the medium for transmission.

Figure 6:
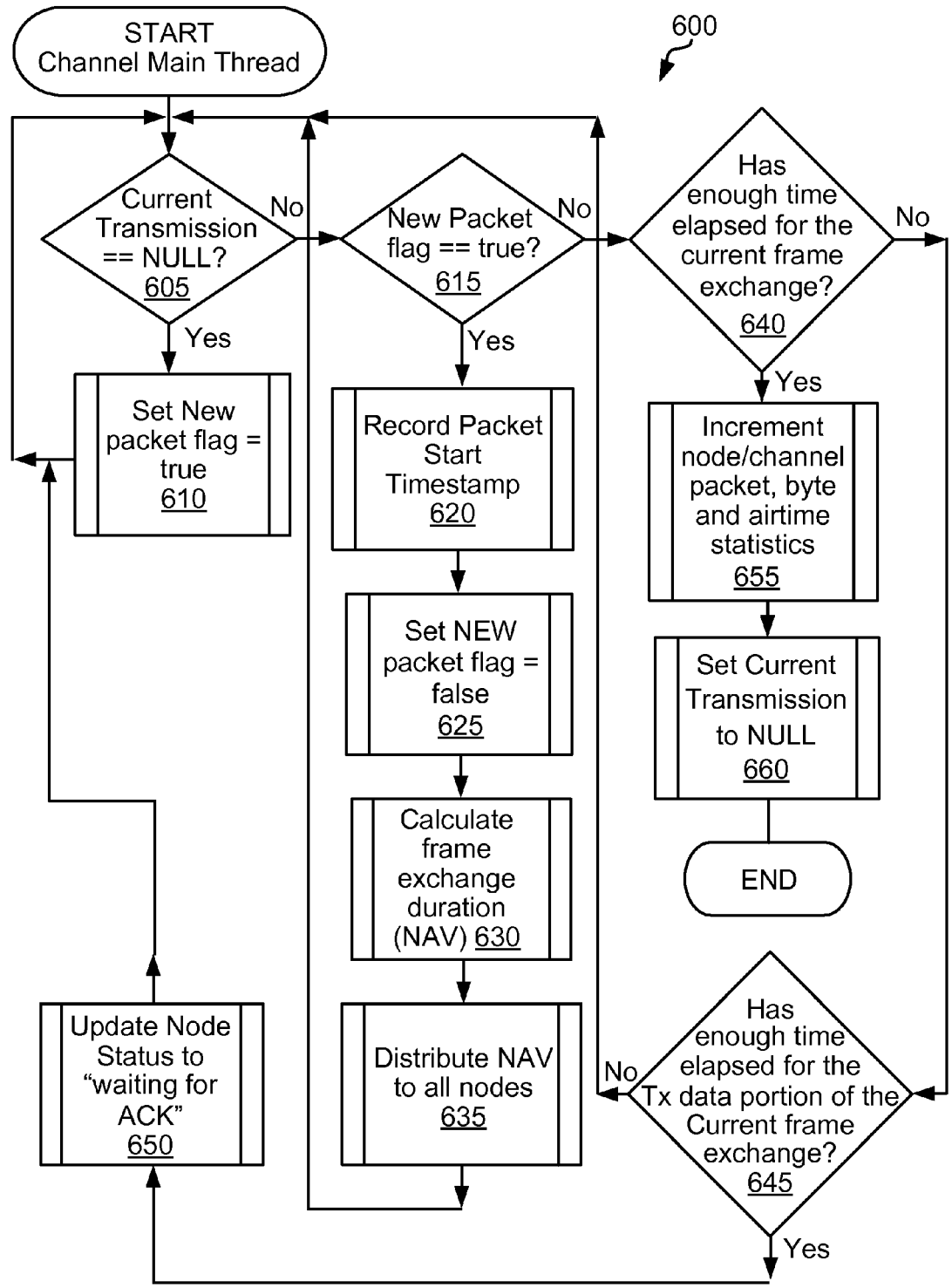
FIG. 6 is a flow diagram providing an example process for a simulated transmission between nodes in a simulated virtual WLAN according to embodiments of the invention.

FIG. 6 is a flow diagram providing an example process 600 for a simulated transmission between nodes in a simulated virtual WLAN according to embodiments of the invention. In one embodiment, process 600 stems from process block 560 of FIG. 5 where a node initiates a transmission according to the simulation. Process 600 provides the portion of the simulation where network and node statistics, such as the throughput statistics, are accumulated and recorded for the simulation. In one embodiment, process 600 is performed by individual nodes in the simulated WLAN of embodiments of the invention.

Process 600 begins at decision block 605, where it is determined whether the current transmission is equal to NULL. If so, the simulation tool sets a new packet flag for the transmission as equal to true at process block 610. The process 600 then returns to decision block 605 again. If the current transmission is not equal to NULL at decision block 605, then the process 600 proceeds to decision block 615, where it is determined whether the new packet flag is equal to true.

If the new packet flag is equal to true, then at process block 620 a packet start timestamp is recorded by the simulation tool. Then, at process block 625, the new packet flag is set to false. At process block 630, the frame exchange duration (NAV) is calculated for the transmission. Then, at process block 635, the calculated NAV from process block 630 is sent to all of the nodes in the simulation virtual WLAN. The process then returns to decision block 605.

If the new packet flag is not equal to true (i.e., false) at decision block 615, then the process 600 proceeds to decision block 640 where it is determined whether enough time has elapsed for the current frame exchange in the transmission. If not, the process continues to decision block 645 where it is determined whether enough time has elapsed for the transmit data portion of the current frame exchange. If enough time has elapsed at decision block 645, then at process block 650 the simulation tool updates the node status to "waiting for acknowledgement" and the process 600 proceeds back to decision block 605. If enough time has not elapsed at decision block 645, then the process 600 proceeds directly back to decision block 605.

If, at decision block 640, enough time has elapsed for the current frame exchange, then at process block 655 the simulation tool increments each of node/channel packet, byte, and airtime statistics. At process block 660, the current transmission is set to NULL. As mentioned above, process 600 allows for the accumulation of the simulation statistics for the network and nodes of a simulated virtual WLAN according to embodiments of the invention.

Figure 7:
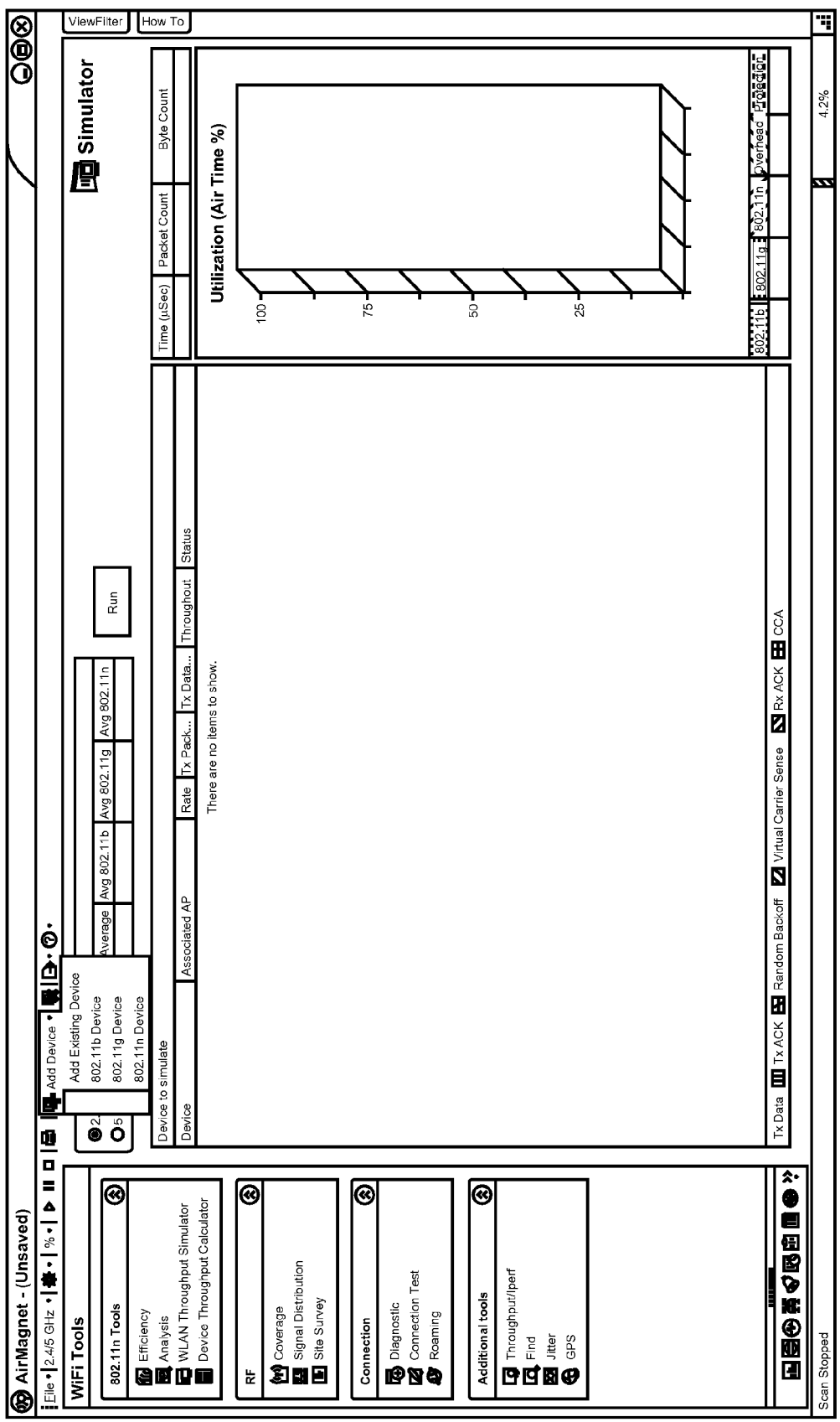
FIG. 7 is an exemplary screenshot of a simulation tool according to embodiments of the invention.

FIG. 7 is an exemplary screenshot of a simulation tool according to embodiments of the invention. Specifically, the screenshot of FIG. 7 depicts the manual modification functionality of the simulation tool. As shown, a user of the simulation tool is able to add devices to the virtual WLAN simulation by selecting any of the options on the drop-down menu shown on the simulation tool window. One skilled in the art will appreciate that the screenshot shown in FIG. 7 is just one embodiment of an implementation of the simulation tool, and embodiments of the invention are not specifically limited to such an implementation.

Figure 8:
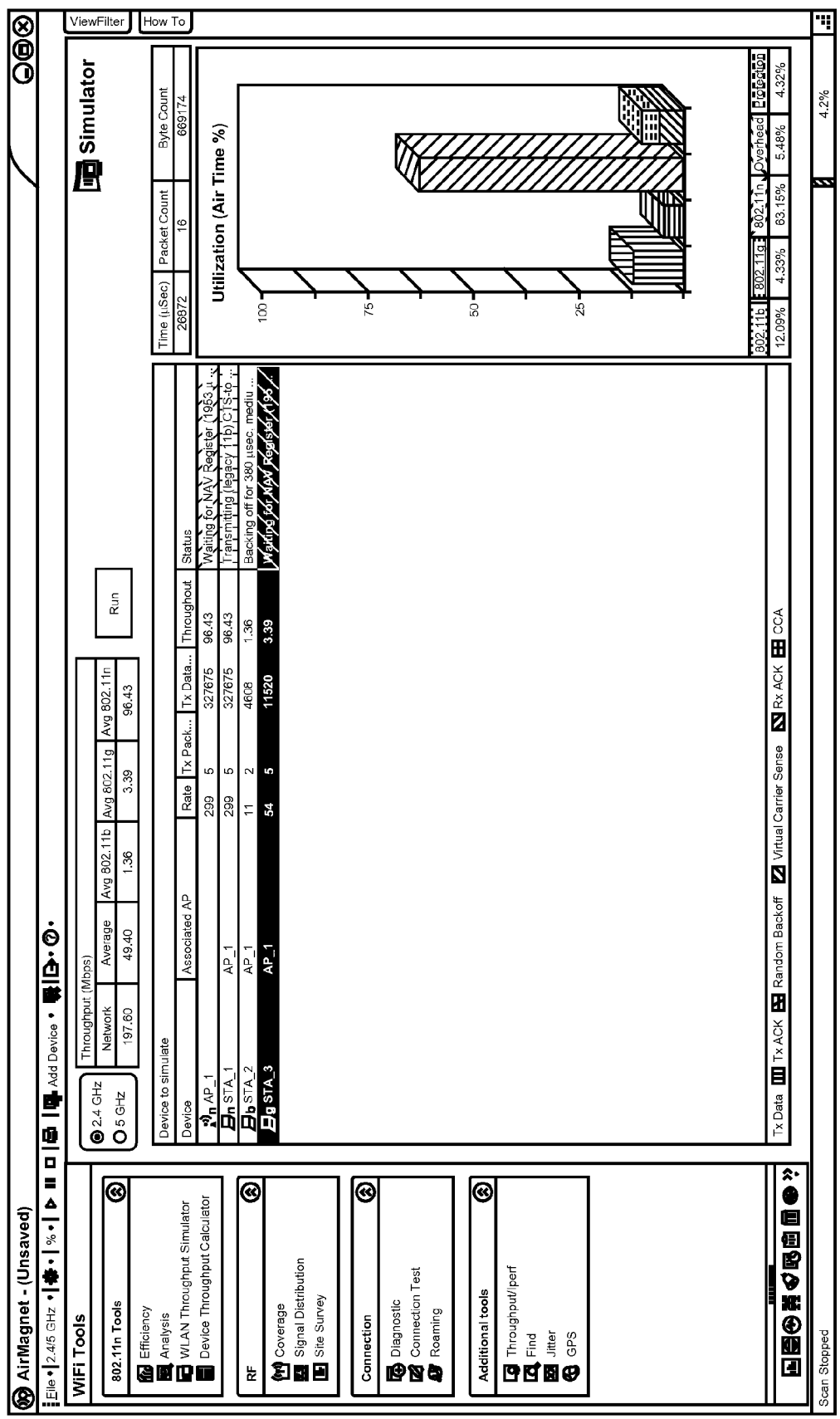
FIG. 8 is an exemplary screenshot of results of an in-progress simulation by a simulation tool according to embodiments of the invention.

FIG. 8 is an exemplary screenshot of results of an in-progress simulation by a simulation tool according to embodiments of the invention. As shown, the screenshot of FIG. 8 depicts the various devices found in the virtual WLAN being simulated, as well as the current simulation statistics shown for each device and for the simulated network as a whole. In one embodiment, the various devices shown in the screenshot of the simulation in FIG. 8 are each performing one of processes 500 and 600 described with respect to FIGS. 5 and 6. One skilled in the art will appreciate that the screenshot shown in FIG. 8 is just one embodiment of an implementation of the simulation tool, and embodiments of the invention are not specifically limited to such an implementation.

It should be noted that, while the embodiments described herein may be performed under the control of a programmed processor, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in propagation medium via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    importing network and node configurations of an existing physical wireless local area network (WLAN) deployment from WLAN surveying system that captures and analyzes WLAN traffic in order to define a configuration of the existing physical WLAN;
    simulating a virtual WLAN using the imported network and node configurations, supplemented with various other artificial configurations not present in the imported network and node configurations, as parameters of the simulated WLAN; and
    analyzing the simulated WLAN to produce throughput statistics of network and nodes of the simulated WLAN.

2. The method of claim 1, wherein the WLAN surveying system includes one or more off-the-shelf IEEE 802.11 conformant WLAN radio devices and a proprietary software system.

3. The method of claim 1, wherein applying various other configurations to the simulated WLAN network includes:
    analyzing the imported network and node configurations of the existing physical WLAN in order to derive the other configurations not directly present in the captured WLAN traffic; and
    receiving the other configurations as one or more manual inputs by an end-user.

4. The method of claim 1, wherein the existing physical WLAN deployment is at least one of a 802.11a, 802.11b, 802.11g, and 802.11n WLAN deployment.

5. The method of claim 1, wherein the parameters include at least one of Data, ACK, RTS, and CTS Frame Lengths, IFS (Interframe Spacing, such as SIFS, DIFS and RIFS), Slot Time, CWMin, CWMax, Signal Extension Bits, Radio Preamble and PLCP Lengths, Maximum payload size, IEEE 802.11 amendment, Symbol Rate, Bits per Symbol, Tail Bits, 802.11n Operating Mode, Greenfield, 20/40 MHz channel width, Short Guard Interval, MCS, Number of Spatial Streams, Frame Aggregation Parameters, Block ACK Policy, PHY Data Rate, Modulation and Coding Type, Non-Greenfield STAs present, Non-ERP STAs present, Protection Mechanisms, AP and STA node designation, AP and STA association, RF Channel, Physical Location, Signal Strength, Transmit Power, and RF Path Loss.

6. The method of claim 1, wherein simulating the WLAN further comprises implementing at least a portion of a Distributed Coordination Function (DCF) defined in an 802.11 specification.

7. The method of claim 1, wherein simulating the WLAN further comprises running a real-time based timing algorithm to observe the run-time behavior of the virtual WLAN with a time-scaling factor.

8. The method of claim 1, wherein the throughput statistics include at least one of overall network throughput, average node throughput, individual node throughput, average node throughput based on media type, air time utilization by an individual node, packet count, and byte count.

9. A machine-accessible medium having stored thereon data representing sets of instructions that, when executed by a machine, cause the machine to perform operations comprising:
    importing network and node configuration of an existing physical wireless local area network (WLAN) deployment from WLAN surveying system that captures and analyzes WLAN traffic in order to define a configuration of the existing physical WLAN;
    simulating a virtual WLAN using the imported network and node configuration, supplemented with various other artificial configurations not present in the imported network and node configuration, as parameters of the simulated WLAN; and
    analyzing the simulated WLAN to produce throughput statistics of network and nodes of the simulated WLAN.

10. The machine-accessible medium of claim 9, wherein applying various other configurations to the simulated WLAN network includes:
    analyzing the imported network and node configurations of the existing physical WLAN in order to derive the other configurations not directly present in the captured WLAN traffic; and
    receiving the other configurations as one or more manual inputs by an end-user.

11. The machine-accessible medium of claim 9, wherein the existing physical WLAN deployment is at least one of a 802.11a, 802.11b, 802.11g, and 802.11n WLAN deployment.

12. The machine-accessible medium of claim 9, wherein the parameters include at least one of Data, ACK, RTS, and CTS Frame Lengths, IFS (Interframe Spacing, such as SIFS, DIFS and RIFS), Slot Time, CWMin, CWMax, Signal Extension Bits, Radio Preamble and PLCP Lengths, Maximum payload size, IEEE 802.11 amendment, Symbol Rate, Bits per Symbol, Tail Bits, 802.11n Operating Mode, Greenfield, 20/40 MHz channel width, Short Guard Interval, MCS, Number of Spatial Streams, Frame Aggregation Parameters, Block ACK Policy, PHY Data Rate, Modulation and Coding Type, Non-Greenfield STAs present, Non-ERP STAs present, Protection Mechanisms, AP and STA node designation, AP and STA association, RF Channel, Physical Location, Signal Strength, Transmit Power, and RF Path Loss.

13. The machine-accessible medium of claim 9, wherein simulating the WLAN further comprises implementing at least a portion of a Distributed Coordination Function (DCF) defined in an 802.11 specification.

14. The machine-accessible medium of claim 9, wherein simulating the WLAN further comprises running a real-time based timing algorithm to observe the run-time behavior of the virtual WLAN with a time-scaling factor.

15. A system, comprising:
- a wireless local area network (WLAN) traffic surveying system to capture and analyze traffic of an existing physical WLAN deployment; and
- a simulation tool communicably coupled to the WLAN traffic surveying system, the simulation tool to:
- import network and node configurations from the WLAN traffic surveying system based analysis of the captured WLAN traffic;
- simulate a virtual WLAN using the imported network and node configurations, supplemented with other artificial configurations not present in the imported network and node configurations, as parameters of the simulated WLAN; and
- analyze the simulated WLAN to produce throughput statistics of the simulated WLAN.

16. The system of claim 15, wherein the existing WLAN deployment is at least one of a 802.11a, 802.11b, 802.11g, and 802.11n WLAN deployment.

17. The system of claim 15, wherein the other configurations include:
- network and node configurations not directly present in the captured WLAN traffic that are derived from analysis of the network and node configurations of the existing physical WLAN; and
- network and node configurations input manually by an end-user.

18. The system of claim 15, wherein the parameters include at least one of Data, ACK, RTS, and CTS Frame Lengths, IFS (Interframe Spacing, such as SIFS, DIFS and RIFS), Slot Time, CWMin, CWMax, Signal Extension Bits, Radio Preamble and PLCP Lengths, Maximum payload size, IEEE 802.11 amendment, Symbol Rate, Bits per Symbol, Tail Bits, 802.11n Operating Mode, Greenfield, 20/40 MHz channel width, Short Guard Interval, MCS, Number of Spatial Streams, Frame Aggregation Parameters, Block ACK Policy, PHY Data Rate, Modulation and Coding Type, Non-Greenfield STAs present, Non-ERP STAs present, Protection Mechanisms, AP and STA node designation, AP and STA association, RF Channel, Physical Location, Signal Strength, Transmit Power, and RF Path Loss.

19. The system of claim 15, wherein in order to simulate the WLAN, the simulation tool further to implement at least a portion of a Distributed Coordination Function (DCF) defined in an 802.11 specification.

20. The system of claim 15, wherein in order to simulate the WLAN the simulation tool further to run a real-time based timing algorithm to observe the run-time behavior of the virtual WLAN with a time-scaling factor.

* * * * *